UNITED STATES PATENT OFFICE.

ALDEN SOLMANS, OF SOUTH NORWALK, CONNECTICUT.

IMPROVEMENT IN STIFFENING HATS.

Specification forming part of Letters Patent No. 216,488, dated June 10, 1879; application filed May 14, 1879.

*To all whom it may concern:*

Be it known that I, ALDEN SOLMANS, of South Norwalk, in the county of Fairfield and State of Connecticut, have invented certain new and useful Improvements in Stiffening Hats, of which the following is a specification.

In the manufacture of hats the stiffening of the hat has usually been done by what is known as "water-stiffening" or by "wine-stiffening."

The water-stiffening consists of shellac dissolved in borax, sal-soda, or other alkaline substance and water; and the wine-stiffening consists of alcohol alone, or of shellac dissolved in alcohol.

The wine-stiffening is much more advantageous than the water-stiffening; but it has been used only on the finer quality of hats, owing to its increased cost.

The object of this invention is to produce a hat equal in quality to a hat stiffened entirely with wine-stiffening, and at a very much less cost.

To this end the invention consists in an improved process of stiffening hats, consisting in first treating the hat with a water-stiffening composed of a solution of shellac, borax, sal-soda, or other alkaline substance and water, and finally applying thereto alcohol, or a solution of shellac in alcohol.

In carrying out my invention, I form the water-stiffening by taking shellac and dissolving it with a suitable alkaline substance in water.

For this purpose the following compound may be used: Take about fifty (50) pounds of shellac, about six and one-half (6½) pounds of borax or sal-soda, about five (5) pounds of rosin, and mix them in a kettle with about eight (8) gallons of water. Heat is then applied, and the ingredients are cooked until they are thoroughly incorporated, forming a thick sirup. I then cool the solution, place it in a tub, and reduce its strength by adding cold water sufficient to bring it to a density of 11° to 14° of the ordinary alkali-hydrometer, when it is ready for use.

The hat-brim is dipped into the solution, and the body has the solution applied to its inside until it is penetrated by the solution nearly to the outside, as in the ordinary water-stiffening. The hat-body is now dried in a heated drying-room, or simply left exposed to the air until the stiffening is set, and preferably until the hat-body is dried.

After the stiffening has become set or the body dried, it is preferably steamed by placing it over a steam-distributer, which may consist of a nozzle or rose covered by a coarse cloth, for the purpose of finely dividing the steam and distributing it uniformly upon the hat. I then apply with a brush to the inside of the whole body, and on the outside of the brim, either alcohol or a solution of shellac and alcohol, composed of about one and a half (1½) to two (2) pounds of the former dissolved in about a gallon of alcohol.

Ordinary water-stiffened or wine-stiffened hats are "cleared," or have the superfluous shellac removed from their surface, by dipping them into a solution of borax or sal-soda and water. Sometimes also wine-stiffened hats have been cleared by sponging with alcohol.

By my process the wine-stiffening applied after the water-stiffening does the clearing by drawing into the body the shellac which remains on the surface of the hat. After being thus treated the hat is thoroughly dried in a heated drying-room, and subsequently steamed and blocked.

By my invention I produce a hat equal in quality to a wine-stiffened hat, and as the larger part of the stiffening is water-stiffening, the cost of hats thus manufactured is much less than those in which wine-stiffening only is used.

What I claim as my invention, and desire to secure by Letters Patent, is—

The improved process of stiffening hats consisting in first applying to them a water-stiffening composed of an alkaline solution of shellac, and subsequently treating them with a wine-stiffening composed of alcohol or alcohol and shellac, substantially in the manner herein described.

ALDEN SOLMANS.

Witnesses:
J. D. HUNTINGTON,
H. PHILIPSON.